United States Patent [19]

Ojala et al.

[11] Patent Number: 5,460,019
[45] Date of Patent: Oct. 24, 1995

[54] WASHER

[75] Inventors: Alpo Ojala; Seppo Rosnell, both of Pori, Finland

[73] Assignee: Sunds Defibrator Pori Oy, Pori, Finland

[21] Appl. No.: 142,335

[22] PCT Filed: Jun. 17, 1992

[86] PCT No.: PCT/FI92/00188

§ 371 Date: Nov. 23, 1993

§ 102(e) Date: Nov. 23, 1993

[87] PCT Pub. No.: WO92/22703

PCT Pub. Date: Dec. 23, 1992

[30] Foreign Application Priority Data

Jun. 17, 1991 [FI] Finland .................... 912919

[51] Int. Cl.[6] .................... D21C 1/02
[52] U.S. Cl. .................... 68/43; 68/158; 68/181 R; 210/404
[58] Field of Search .................... 8/156; 68/43, 158, 68/181 R; 210/402, 404; 162/60

[56] References Cited

U.S. PATENT DOCUMENTS

| 2,725,145 | 11/1955 | Mylius | 210/402 |
| 2,765,085 | 10/1956 | Strindlund | 210/402 X |
| 3,125,514 | 3/1964 | Frykhult | 210/404 X |
| 3,878,698 | 4/1975 | Friksson et al. | 68/43 X |
| 4,266,413 | 5/1981 | Yli-Vakkuri | 68/181 R X |
| 4,292,123 | 9/1981 | Lintunen et al. | 68/181 R X |
| 4,551,248 | 11/1985 | Lenac | 210/404 |
| 4,808,265 | 2/1989 | Luthi et al. | 68/43 X |
| 5,046,338 | 9/1991 | Luthi | 68/43 |
| 5,281,343 | 1/1994 | Lewis et al. | 210/404 X |

FOREIGN PATENT DOCUMENTS

| 2506527 | 8/1976 | Germany | 210/404 |
| 70317 | 5/1980 | Japan | 210/404 |
| 21366 | 5/1982 | Japan | 210/404 |
| 224131 | 1/1969 | Sweden | 210/404 |
| 447831 | 12/1986 | Sweden . | |

*Primary Examiner*—Philip R. Coe
*Attorney, Agent, or Firm*—Burns, Doane, Swecker & Mathis

[57] ABSTRACT

The invention concerns a drum washer. The washer has a shaft formed by two cones (46) placed with their bases against one another. The shaft can be used as a supporting structure for the drum. Vanes (48) can also be placed on it for assisting in collecting washing liquid falling from the upper part of the drum separately from the washing liquid ending up on the bottom of the drum. The washer is especially suitable for washing cellulose pulp.

20 Claims, 3 Drawing Sheets

WASHER

PRIOR ART

The invention concerns socalled drum washers, which are used especially for washing pulp suspensions in the cellulose industry.

BACKGROUND OF THE INVENTION

In cylinder washers there is a rotatable cylindrical drum, which is pervious to the washing liquid and onto the case of which pulp to be washed is fed constantly to form a mat. Washing liquid is conducted onto the top of the mat and it then passes through the mat and the case, entering the drum, from which it is removed by way of the drum end. The washed pulp is worked loose and removed from the case.

Such drum washers are also known wherein the filtrate obtained in a final washing stage is recovered within the drum with the aid of a special collecting trough. This filtrate is then reused as washing liquid for the initial stage. Such a device is described, for example, in a brochure by the name of Rauma-Repola Pro-feed Pressure Washers, Rauma 1985.

However, it is technically difficult to bring about such collecting trough systems of the said kind, which would operate reliably.

GENERAL DESCRIPTION OF THE INVENTION

The purpose of this invention is primarily to bring about a two-step cylinder washer having a technically reliable but simple system for collecting the filtrate in the final washing step.

The purpose of the invention is achieved by a washer including a cylindrical drum with a case that is permeable to washing liquid but is impermeable to the particles to be washed and has an aperture in an end plate. A shaft is attached to the drum, the shaft having two cones joined together with their bases against one another, and the drum is disposed for rotation in a basin. An assembly conducts a suspension to be washed onto the drum case where the suspension forms a mat, a second assembly conducts washing liquid through the particle mat into the drum, and a third assembly removes washing liquid from inside the drum. The third assembly includes means for removing the filtrate accumulated on a drum bottom and means for separately removing the filtrate obtained in a final washing stage from an upper part of the drum. An additional assembly removes washed pulp from the drum. The other claims present advantageous applications of the invention.

DETAILED DESCRIPTION OF AN EMBODIMENT OF THE INVENTION

In the following a cellulose pulp washer according to the invention is described as an example.

In the drawings of the specification

Figure 1:
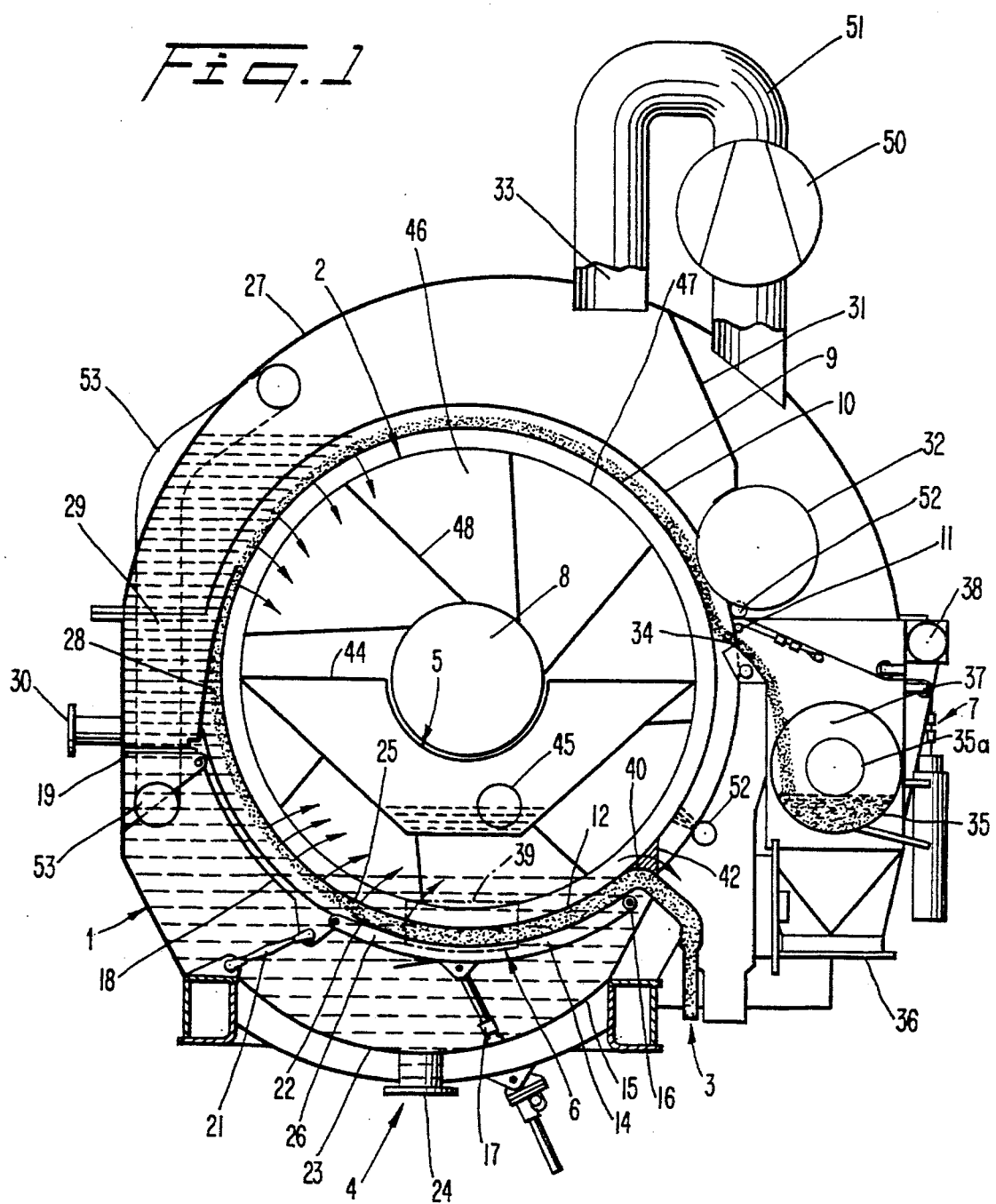
FIG. 1 is an end view of the washer and washing process looking from the end of the washing drum.

The main washer components are a basin 1 attached to the body, a filtering drum 2 rotatable within the basin, an assembly 3 for feeding pulp to be washed, an assembly 4 for supplying washing water, piping 5 for circulating washing water, an assembly 6 for removing washing water and an assembly 7 for removing washed pulp.

A cylindrical case 9 permeable to washing water is attached to the shaft 8 within the filtering drum. The shaft ends protrude from the open ends of the drum into bearings mounted on the body. The drum rotates clockwise as seen in FIG. 1.

Figure 2:
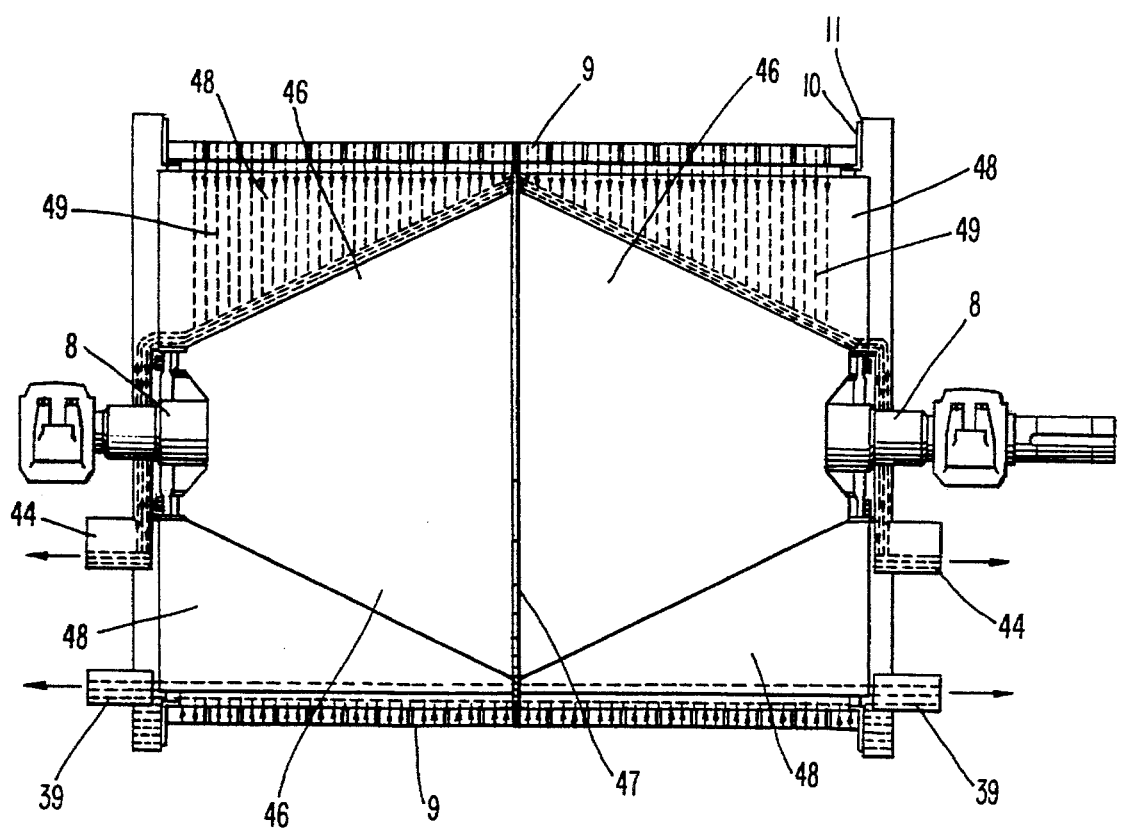
FIG. 2 is an axial cross-section of the washer drum.
Figure 3:
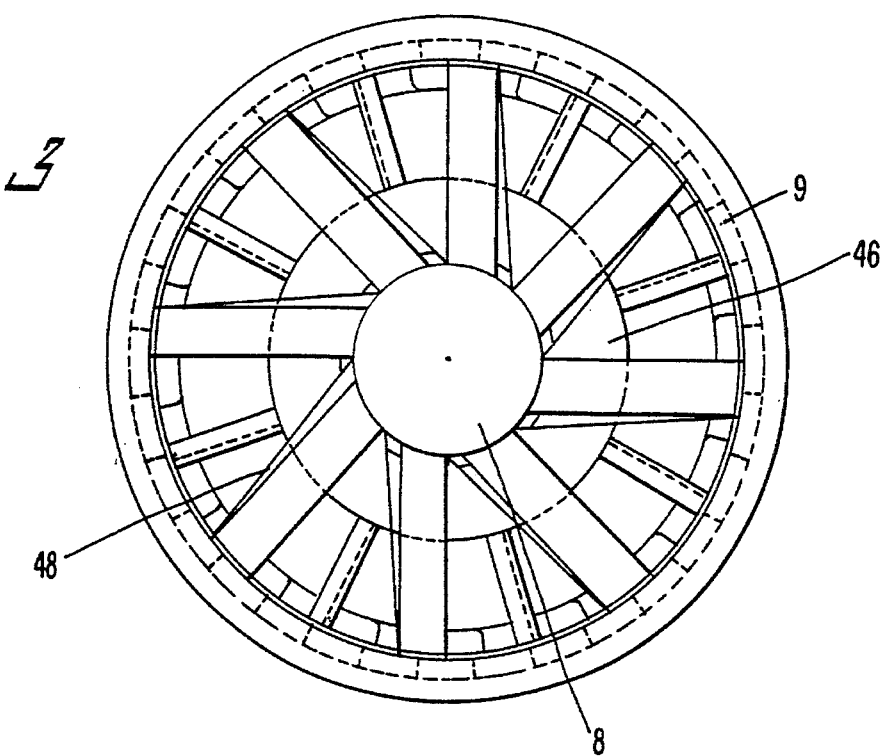
FIG. 3 shows an end view from the drum end of the second-step washing liquid collecting equipment placed on the drum shaft.
Figure 4:
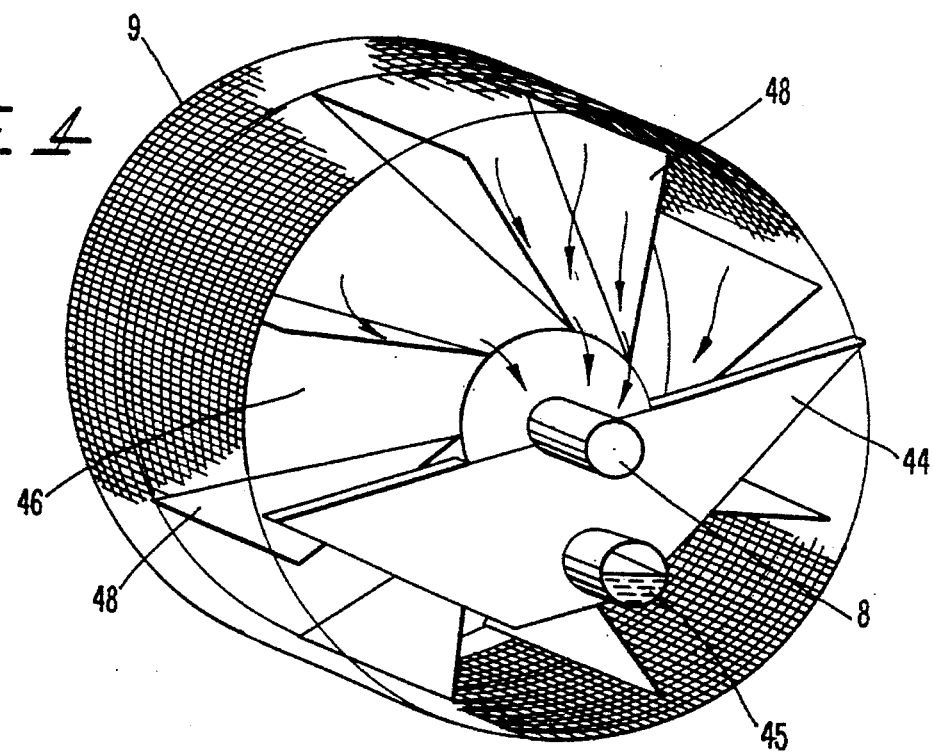
FIG. 4 shows the other drum end and its washing liquid collecting equipment as seen obliquely from the end.

The case 9 ends have flanges 10. On the exterior side of these there are sealing means 11 matching with the basin ends (FIG. 2).

Pulp 12 to be washed is fed into the basin and through the assembly 13 to an approximate four–five o'clock position in relation to the axis of rotation.

The pulp flow 12 supplied into the basin is guided to form a mat against the drum case 9 with the aid of a guiding plate 14 which is parallel with the case. The front end of the guiding plate is journalled tightly in the bottom wall 15 of the basin on a shaft 16 which is parallel with the drum shaft. The distance of the guiding plate from the drum periphery can be adjusted by bars 17. A follower plate 18 is located after the guiding plate. Its back end is journalled tightly on shaft 20 in a partition wall 19. The partition wall is located in an approximate eight–nine o'clock position in the rotational direction of the drum. The distance between follower plate and drum periphery is adjustable by using bars 21. A gap 22 is left between the plates.

The bottom wall 15 of the basin, the guiding plate 14, the follower plate 18 and the partition 19 form a feeding space 23 for first stage washing water. Washing water is supplied into this space by way of an assembly 24. The washing water passes through the gap 22 on to the pulp mat and further through the mat and through the drum periphery, entering the drum.

A flexible lip 25 forms an extension of the back edge of the guiding plate 14 and it is compressed on to the follower plate 18 from the drum side. It functions as a flap valve in gap 22 to prevent pulp from entering the washing water feeding space 23. Below the lip the lip is provided with support forks 26 articulated to the follower plate. Their free ends are located on top of the guiding plate extension.

A pulp mat compression plate 28 forms an extension to the follower plate 18.

The upper part of the basin is closed tightly by a hood 27.

The bottom wall 15 of the basin, its partition 19 and the hood 27 mark the limits of a second-step washing water feeding box 29. Washing water can be fed into the box through an assembly 30.

At an approximate two—three o'clock position in relation to the drum's rotational direction there is a partition 31 in the hood and a sealing means 32, which presses against the pulp mat and consists of a roller rotating against the mat. In the space thus formed in the upper part of the chamber a positive pressure (for example, 0.3 bar) is created by supplying air through the assembly 33. The positive pressure assists in moving washing water through the mat.

A device 34 (scraper) for detaching the mat is located behind the sealing means 32 to remove the mat from the drum into a chute 35. The pulp is transported through the chute into line 36 with the aid of a screw conveyor 35a which is mounted in the chute 35 and viewed along the screw axis. The chute may also be equipped with pulp mat comminutor means 37, for example, suitable obstacles. Diluting water is also supplied into the chute through an assembly 38.

The filtrate accumulated on the drum bottom exits by way of an aperture 39 in the basin end.

The top edge of the pulp feeding assembly 13 is sealed against the drum periphery. Thus, an overflow area 40 is formed which assists in keeping the filtrate level in the drum at a constant level. The water passing through the drum also cleans the holes in the case 9 removing any attached fibres. Due to the positive pressure in the chamber, air passes above the overflow area from the region 41 and through the holes, thus also cleaning the holes. There is also a cleaning scraper 42 in front of the overflow area.

Naturally, the filtrate obtained from the upper part of the drum in the final washing stage is cleaner than the filtrate of the early stage. This cleaner filtrate is recovered separately into collecting troughs 44, which are located below the drum shaft ends and from which the filtrate is removed along lines 45.

The drum shaft 8 has two fixed similar circular-based cones 46 located with their bases against one another. A flange 47 extends along their base seam and is attached to the drum case 9 with radial support bars so that air is admitted between the case and the flange.

Vanes 48 are attached to the surface of each cone 46. The vanes are essentially triangular. There is a straight gap between the vane and the drum case 9.

Filtrate entering through the drum case 9 in the upper part of the drum falls down onto the vanes 48 and runs along these onto the cone 46 surface and further into the collecting trough 44 located under the shaft 8 end.

The vanes 48 are not located radially, but they are turned slightly backwards in the rotational direction. In this way that sector is reduced from which the filtrate is collected. In the embodiment shown in the figures, filtrate collection begins at approximately 45° before the top position of the vane.

By varying the tilt angle of the vanes 48 and their position in relation to the shaft 8 as well as their shape and size the length of the collection sector and the efficiency of collection can be adjusted.

The vanes 48 may be provided with grooves or corrugations 49, which guide the flow toward the cone 46 surface (FIG. 2). The vane rigidity is increased at the same time.

Naturally, the drum's rotational speed must not become so high that the centrifugal force would begin making the filtrate run with greater difficulty on the vanes 48. With the described washer, wherein the diameter is 2.5 m and the length 3 m, a suitable rotational speed is, for example, 0.5–6 revolutions per minute.

The cleaner filtrate collected into the troughs 44 can be used, for example, by the same washer as washing liquid supplied to the first step.

The pressurized air which is conducted into the hood 27 is taken from the pulp exit side from a pulp screw space limited by the partition 31 by way of the line 51 and using a pump 50. In this way, a low pressure is created on the exit side to further the transfer of washing water and the removal of pulp from the case 9.

A cleaning scraper 52 may be connected for use in connection with the sealing roller 32.

Cleaning of the case 9 is furthered also by using a water jet 52 located in the area 41 after the pulp exit area.

The washing water feeding space 23 and the air space in the hood 27 are interconnected by a pressure pipe 53. Thus, the positive pressure within the hood is made to affect the feeding space 23 as well. At the same time, the pipe functions as a safety device, balancing the water pressure within the feeding space 23.

Pressure indicators are connected to the assembly at various points for allowing adjustment e.g. of the pressure and of the speed of rotation according to their indications, when required.

In technical terms, the described system for collecting filtrate in the second step can easily be constructed to operate reliably. A significant additional advantage is that the drum's strength can be essentially increased.

It is possible in principle to make the second cone on the shaft simply in the form of a ring located at the other end of the drum. In this way a filtrate collection system is obtained which is based on one cone only. Such a solution could be useful, for example, with relatively narrow drums or if it is desirable for some reason to have the filtrate leave only from one end of the drum.

We claim:

1. A washer for washing with water a suspension containing solid particles, comprising:

a cylindrical drum with a case permeable to washing liquid but impermeable to the particles to be washed;

an end plate on the drum having an aperture;

a shaft attached to the drum formed by two cones joined together with their bases against one another to rotatably support the drum;

a basin in which the drum is located for rotation;

an assembly for conducting the suspension to be washed onto the drum case where it forms a particle mat;

an assembly for conducting washing liquid through the particle mat into the drum comprising a first washing stage located in a bottom part of the basin and a second wash stage located in an upper part of the basin;

an assembly for removing washing liquid from inside the drum, which assembly comprises first means for removing washing liquid accumulated in the drum in the first washing stage and second means for separately collecting and removing washing liquid from the drum obtained in a second washing stage; and, an assembly for removing washed particles from the drum.

2. A washer as defined in claim 1, wherein the cones forming the shaft each have a surface and an end, and wherein said means for collecting and removing washing liquid from the second washing stage comprises vanes located on the surface of at least one of said cones and a collecting trough located at the end of said at least one cone below the shaft, so that washing liquid flowing along the vanes and along the cone surface falls into the collecting trough.

3. A washer as defined in claim 2, wherein the cone bases are attached to the case of the drum.

4. A washer as defined in claim 3, wherein the cone bases include a flange and the flanges are attached to the case so that air is allowed to pass between the case and the flange.

5. A washer as defined in claim 3 wherein the assembly for conducting the suspension to be washed onto the drum case to form a mat includes two plates disposed sequentially in a rotational direction of the drum and parallel with the drum at a distance from the drum case, whereby the suspension to be washed is conducted between the first of these plates and the drum case, and said plates being disposed with a gap between the plates and parallel with the drum shaft, and further comprising a flap valve located in the gap to allow washing liquid to pass through the gap to the drum but to prevent pulp from passing from the drum through the gap, and wherein the first washing stage comprises a first stage washing liquid feeding space from which washing liquid is conducted through the gap between the plates.

6. A washer as defined in claim 2, wherein the assembly for conducting the suspension to be washed onto the drum case to form a mat includes two plates disposed sequentially in a rotational direction of the drum and parallel with the drum at a distance from the drum case, whereby the suspension to be washed is conducted between the first of these plates and the drum case, and said plates being disposed with a gap between the plates and parallel with the drum shaft, and further comprising a flap valve located in the gap to allow washing liquid to pass through the gap to the drum but to prevent pulp from passing from the drum through the gap, and wherein said first washing stage comprises a first stage washing liquid feeding space from which washing liquid is conducted through the gap between the plates.

7. A washer as defined in claim 2, wherein said means for conducting washing liquid into the drum includes a first stage washing liquid feeding space located in a lower part of the basin and a second stage washing liquid feeding box located above the first stage washing liquid feeding space.

8. A washer as defined in claim 2, wherein the basin is closed and the case edges are sealed against the basin wall.

9. A washer as defined in claim 2, wherein the assembly for removing washed pulp from the drum comprises a chute, a screw conveyor located in the chute and means in the chute for comminuting the pulp mat.

10. A washer as defined in claim 1, wherein the cone bases are attached to the case of the drum.

11. A washer as defined in claim 10, wherein the cone bases are formed with a flange and the flanges are attached to the case so that air is allowed to pass between the case and the flange.

12. A washer as defined in claim 11, wherein the assembly for conducting the suspension to be washed onto the drum case to form a mat includes two plates disposed sequentially in a rotational direction of the drum and parallel with the drum at a distance from the drum case, whereby the suspension to be washed is conducted between the first of these plates and the drum case, and said plates being disposed with a gap between the plates and parallel with the drum shaft, and further comprising a flap valve located in the gap to allow washing liquid to pass through the gap to the drum but to prevent pulp from passing from the drum through the gap, and wherein the first washing stage comprises a first stage washing liquid feeding space from which washing liquid is conducted through the gap between the plates.

13. A washer as defined in claim 10, wherein the assembly for conducting the suspension to be washed onto the drum case to form a mat includes two plates disposed sequentially in a rotational direction of the drum and parallel with the drum at a distance from the drum case, whereby the suspension to be washed is conducted between the first of these plates and the drum case, and said plates being disposed with a gap between the plates and parallel with the drum shaft, and further comprising a flap valve located in the gap to allow washing liquid to pass through the gap to the drum but to prevent pulp from passing from the drum through the gap, and wherein the first washing stage comprises a first stage washing liquid feeding space from which washing liquid is conducted through the gap between the plates.

14. A washer as defined in claim 1, wherein the assembly for conducting the suspension to be washed onto the drum case to form a mat comprises two plates disposed sequentially in a rotational direction of the drum and parallel with the drum at a distance from the drum case, whereby the suspension to be washed is conducted between a first of these plates and the drum case, and said plate being disposed with a gap between the plates and parallel with the drum shaft, and further comprising a flap valve located in the gap to allow washing liquid to pass through the gap to the drum but to prevent pulp from passing from the drum through the gap, and wherein said first washing stage comprises a first stage washing liquid feeding space from which washing liquid is conducted through the gap between the plates.

15. A washer as defined in claim 14, wherein said means for conducting washing liquid into the drum further comprises a second stage washing liquid feeding box (29) located in the basin above the first stage washing liquid feeding space.

16. A washer as defined in claim 1, wherein the assembly for conducting washing liquid into the drum includes a first stage washing liquid feeding space and a second stage washing liquid feeding box located above the first stage washing liquid feeding space.

17. A washer as defined in claim 16, further comprising an assembly for creating a positive pressure in an air space provided above the second stage washing water feeding box.

18. A washer as defined in claim 17, further comprising a pipe connecting the air space above the second stage washing water feeding box and the first stage washing liquid feeding space.

19. A washer as defined in claim 1, wherein the basin is closed and the case edges are sealed against a basin wall.

20. A washer as defined in claim 1, wherein the assembly for removing washed pulp from the drum includes a chute, a screw conveyor located in the chute and means in the chute for comminuting the pulp mat.

* * * * *